A. AUDIA.
FOLDING TOP FOR AUTOMOBILES.
APPLICATION FILED APR. 27, 1918.
1,301,894.
Patented Apr. 29, 1919.
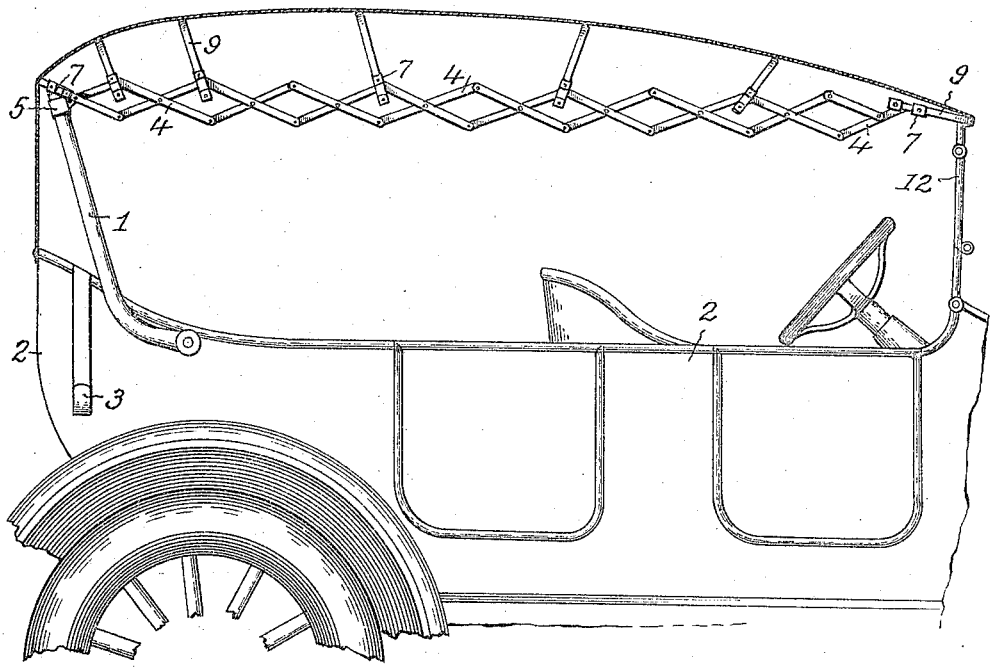
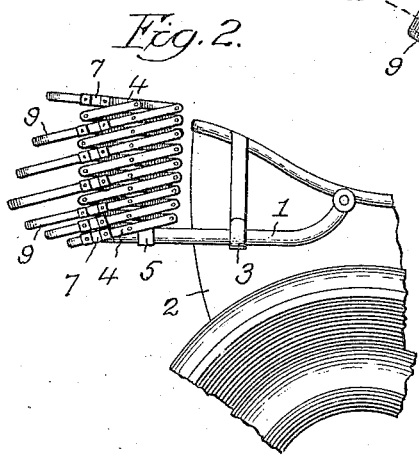
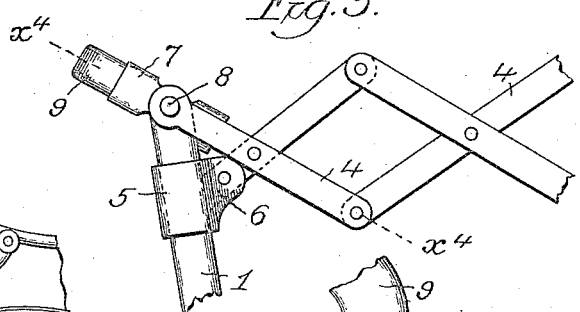
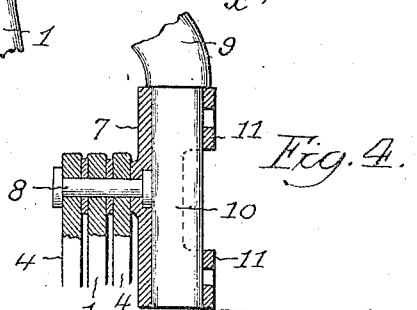
Witness:
John Enders
Inventor:
Antonio Audia,
by Robert Burns
Atty.

UNITED STATES PATENT OFFICE.

ANTONIO AUDIA, OF CHICAGO, ILLINOIS.

FOLDING TOP FOR AUTOMOBILES.

1,301,894.  Specification of Letters Patent.  Patented Apr. 29, 1919.

Application filed April 27, 1918. Serial No. 231,100.

*To all whom it may concern:*

Be it known that I, ANTONIO AUDIA, a citizen of the United States of America, and a resident of Chicago, in the county of Cook, State of Illinois, have invented certain new and useful Improvements in Folding Tops for Automobiles, of which the following is a specification.

This invention relates to that type of folding tops for automobiles adapted to fold together at the rear end of the vehicle into a small compass, and has for its object;—

To provide a structural formation and combination of parts in a folding top of the type above mentioned, providing a light, strong and durable structure adapted to fold together in a close and compact manner, and dispense with the usual intermediate supporting means which are required with the ordinary type of folding tops when in an open or spread condition, all as will hereinafter more fully appear.

In the accompanying drawing;—

Figure 1, is a side elevation illustrating the present folding top in a spread or open condition on an automobile body.

Fig. 2, is a detail side view of the same in a folded condition.

Fig. 3, is an enlarged detail elevation of the connection of the folding frame and hinged supporting brace which connects the folding top to the automobile body.

Fig. 4 is a detail transverse section on line X⁴—X⁴, Fig. 3, illustrating the connection of the transverse bows to the folding frame of the folding top.

Referring to the drawing, 1 designates one of the pair of rearwardly disposed braces by which the folding top of an automobile is carried. Each brace is preferably of the curved form shown and pivoted at its lower end to a side of the automobile body 2 so as to be capable of being folded down into a position at the back of said body 2 and be supported by a stirrup bracket 3 fixed on a side of the body 2, as usual in folding automobile tops now in general use.

4 designates one of the pair of side members of the folding frame above referred to, and which is formed of pairs of crossed links pivotally connected together at their mid-length, and with the pairs pivotally connected together at their adjacent ends to constitute a folding skeleton frame or structure of the well known "lazy tongs" type. In the construction illustrated in Fig. 4, the pairs of links above referred to, are formed by a single inner link and counterpart outer links arranged at opposite sides of said inner link.

In the present invention the rear ends of the counterpart outer links of the rearmost pair of links of a side number 4 are pivotally attached to opposite sides of the upper end of the supporting brace 1, while the rear end of the companion inner link of said rearmost pair of links is pivotally attached between a pair of pivot lugs of a sleeve 5 slidingly mounted on the aforesaid supporting brace 1, and in the construction shown in Fig. 3, the rear end of the inner link above described has a heel or prolongation 6 extending beyond its pivot axis in the side lugs aforesaid, and adapted in the final pivotal movement of the link in an unfolding of the automobile top, to abut against the side of the brace 1 to stop further unfolding movement of the link and effect a rigid bracing of the parts in their unfolded condition.

7 designates a plurality of socket members pivotally associated with the series of pairs of links above described, at points where pairs of said links are pivotally attached together, and preferably by the same pivot bolt or rivet 8 by which said links are connected together, as illustrated in Fig. 4.

In the preferred arrangement of parts shown in the drawing, socket members 7 are located at the points of pivotal connection of the three rearmost pairs of links, and at alternate points of pivotal connection of the remaining and forward pairs of links. From practical experiment the described arrangement has been found to provide a strong and effective structure adapted for convenient manipulation.

9 desginates a series of transverse wooden supporting bows for the usual pliable top or roof covering, said bows are of the usual yoke shape and are provided with depending tenons 10 adapted to fit socket sleeves 11 on the socket members 7 in a firm and substanial manner. In the preferred construction shown in Fig. 4, the front sides of the socket sleeves 11 are cut-away, to leave the wooden tenons 10 exposed so that the same may receive the fastening nails by which the usual pliable roof covering above referred to is secured in place.

12 designates the usual front standards or posts on the dash of the automobile, and to which the front ends of the extension frames above described, are secured in any usual manner, when in a spread or extended condition, and as usual in folding top structure now in general use.

Having thus fully described my said invention, what I claim as new and desire to secure by Letters Patent, is:—

In a folding top for automobiles, the combination of supporting brace hinged at its lower end to the automobile body, a series of pairs of crossed links pivotally connected together to constitute an extensible frame, the rear pair of links comprising an inner link and a pair of outer links pivotally attached to the sides of the upper end of the brace aforesaid, a sleeve sliding on said brace and having pivot ears between which the aforesaid inner link is pivoted, the pivot end of said inner link being provided with an extension heel adapted to abut against the brace and limit upward movement of said sleeve, and a front standard attached to the automobile body and connected to the front end of the extension frame when extended, substantially as set forth.

Signed at Chicago, Illinois, this 25th day of April, 1918.

ANTONIO AUDIA.

Copies of this patent may be obtained for five cents each, by addressing the "Commissioner of Patents, Washington, D. C."